US008759794B2

(12) United States Patent
Rapoport et al.

(10) Patent No.: US 8,759,794 B2
(45) Date of Patent: Jun. 24, 2014

(54) ARTICLES, METHODS OF VALIDATING THE SAME, AND VALIDATION SYSTEMS EMPLOYING DECAY CONSTANT MODULATION

(71) Applicant: Honeywell International Inc., Morristown, NJ (US)

(72) Inventors: William Ross Rapoport, Bridgewater, NJ (US); James Kane, Lawrenceville, NJ (US); Carsten Lau, Niedersachen (DE)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/777,200

(22) Filed: Feb. 26, 2013

(65) Prior Publication Data
US 2014/0021369 A1    Jan. 23, 2014

Related U.S. Application Data

(60) Provisional application No. 61/673,829, filed on Jul. 20, 2012.

(51) Int. Cl.
G07D 7/14    (2006.01)
(52) U.S. Cl.
CPC .................................. G07D 7/14 (2013.01)
USPC ...................................................... 250/459.1
(58) Field of Classification Search
CPC ............................................... G07D 1/14
USPC ............ 250/458.1, 459.1, 461.1, 271; 283/92
See application file for complete search history.

(56) References Cited

U.S. PATENT DOCUMENTS

| 7,030,371 | B2 * | 4/2006 | Vasic et al. ..................... 250/271 |
| 8,263,948 | B2 | 9/2012 | Rapoport et al. |
| 2004/0209052 | A1 | 10/2004 | Tam et al. |
| 2007/0138438 | A1 | 6/2007 | Hampden-Smith et al. |
| 2008/0116272 | A1 * | 5/2008 | Giering et al. ................ 235/439 |
| 2009/0008454 | A1 * | 1/2009 | Jones et al. .............. 235/462.01 |
| 2010/0102250 | A1 * | 4/2010 | Li et al. ...................... 250/459.1 |

FOREIGN PATENT DOCUMENTS

KR    1020010013237 A    2/2001
WO    9855333 A1    12/1998

OTHER PUBLICATIONS

The International Search Report mailed Jun. 4, 2013 in International Application No. PCT/US2013/031268.

* cited by examiner

Primary Examiner — David Porta
Assistant Examiner — Faye Boosalis
(74) Attorney, Agent, or Firm — Ingrassia Fisher & Lorenz, PC

(57) ABSTRACT

Articles, methods of validating the articles, and validating systems are provided herein. In an embodiment, an article includes a substrate and a security feature on the substrate. The security feature includes a first region that has a first ink composition and a second region that has a second ink composition. The first ink composition includes a first luminescent phosphor and the second ink composition includes a second luminescent phosphor that is different from the first luminescent phosphor. The first luminescent phosphor and the second luminescent phosphor have indistinguishable excitation energy wavelengths, indistinguishable emission wavelengths, and distinguishable temporal decay properties.

20 Claims, 2 Drawing Sheets

ARTICLES, METHODS OF VALIDATING THE SAME, AND VALIDATION SYSTEMS EMPLOYING DECAY CONSTANT MODULATION

PRIORITY CLAIMS

This application claims the benefit of U.S. Provisional Application No. 61/673,829, filed Jul. 20, 2012.

TECHNICAL FIELD

The technical field generally relates to articles including security features, methods of validating the articles including the security features, and validating systems for validating the articles. More particularly, the technical field relates to articles including security features that are validated by detecting decay constant modulation.

BACKGROUND

An article that includes a security feature, such as a value document, can be validated in many ways. Some methods involve visible (i.e. overt) security features that are disposed on or incorporated into the article, such as a hologram on a credit card, an embossed image or watermark on a bank note, a security foil, a security ribbon, colored threads or colored fibers within a bank note, or a floating and/or sinking image on a passport. While these features are easy to detect with the eye and may not require equipment for authentication, these overt features are easily identified by a would-be forger and/or counterfeiter. As such, in addition to overt features, hidden (i.e. covert) features may be incorporated in value documents. Examples of covert features include invisible fluorescent fibers, chemically sensitive stains, and luminescent pigments or fluorescent dyes that are incorporated into the substrate of the value document. Covert features may also be included in the ink that is printed onto the substrate of the value document or within the resin used to make films that are used in laminated value documents.

Value documents, such as banknotes, are often processed at high speed in sorting machines such as banknote processing systems, and it is desirable to conduct validation of the value documents in the sorting machines to maximize efficiency and minimize a risk of counterfeit value documents from passing undetected. One covert feature that has been developed to validate value documents that are moving at high speed involves incorporating luminescent phosphors in or on the value documents through paper, inks, or other security features that are employed to make the value documents. Properties of particular luminescent phosphors used in a given value document are generally tightly guarded in order to maintain a high level of security. The presence of the luminescent phosphors allow for rapid validation of the value document when a number of parameters are interrogated.

To enhance security and difficulty in identification of particular luminescent phosphors, the value documents often include a plurality of regions that include different ink compositions that have different luminescent phosphors, and the validation techniques include detecting the presence of particular luminescent phosphors in distinct regions of the value document. However, over the past several years, counterfeiting has become an increasing problem and the ability of the counterfeiters to mimic the security features has increased substantially. Once sophisticated counterfeiters identify that a value document has a plurality of regions that include different inks, modern spectroscopic tools as well as public domain documents on emissive materials that include spectra can often be employed to identify specific luminescent phosphors. Once identified, the luminescent phosphors can be mimicked and used to create value documents that can pass high speed sorting tests.

The approach of going to more esoteric luminescent phosphors and the use of multiple materials often leads to higher usage rates, more complex production methods, higher costs, and lower material yields. Esoteric luminescent phosphors that can be produced in laboratory environments may prove challenging to scale to commercially required amounts.

Validation systems that involve detecting the decay time of a luminescent phosphor that is excited by a visible or ultraviolet light source in a stationary situation have been available for years and, recently, techniques have been developed that allow decay time constants (Tau) of luminescent phosphors to be measured at high speed in sorting machines. The decay time constants of luminescent phosphors can be controlled by the use of disturbing ions that impact decay times of the luminescent phosphors or by other effects such as concentration quenching. However, counterfeiters are still capable of identifying decay time parameters and mimicking the decay time parameters of specific luminescent phosphors once chemical components in the luminescent phosphors are identified.

Accordingly, it is desirable to provide security features on substrates of an article that can be employed to validate the article under conditions in which the substrate is either stationary or moving, such as in high speed sorting devices. It is also desirable to provide security features that are difficult to replicate, and that contain separate regions including different inks whose differences are difficult to detect. Furthermore, other desirable features and characteristics of the present invention will become apparent from the subsequent detailed description of the invention and the appended claims, taken in conjunction with the accompanying drawings and this background of the invention.

BRIEF SUMMARY

Articles, methods of validating the articles, and validating systems are provided herein. In an embodiment, an article includes a substrate and a security feature on the substrate. The security feature includes a first region that has a first ink composition and a second region that has a second ink composition. The first ink composition includes a first luminescent phosphor and the second ink composition includes a second luminescent phosphor that is different from the first luminescent phosphor. The first luminescent phosphor and the second luminescent phosphor have indistinguishable excitation energy wavelengths and emission wavelengths, but distinguishable temporal decay properties.

In another embodiment, a method of validating an article includes providing an article including substrate and a security feature on the substrate. The security feature includes a first region that has a first ink composition and a second region that has a second ink composition. The first ink composition includes a first luminescent phosphor and the second ink composition includes a second luminescent phosphor that is different from the first luminescent phosphor. The first luminescent phosphor and the second luminescent phosphor have indistinguishable excitation energy wavelengths and emission wavelengths, but distinguishable temporal decay properties. The article is exposed to light that is produced by an exciting light source that produces light having sufficient intensity to excite the first luminescent phosphor and the second luminescent phosphor. A first image of an area of the article including at least a portion of the first region or at least a portion of the second region is detected at a first time. A second image of substantially the same area of the article is detected at a second time. At least one first image and second image is detected for the area including the first region, and at least one first image and second image is detected for the area including the second region. Pass or failure data for the article is determined based upon expected temporal decay properties for the type of first luminescent phosphor or second luminescent phosphor present in the area of the first image and the second image.

In another embodiment, a validation system is provided that includes a validation device. The validation device is configured to validate an article that includes a substrate and a security feature on the substrate. The security feature includes a first region that has a first ink composition and a second region that has a second ink composition. The first ink composition includes a first luminescent phosphor and the second ink composition includes a second luminescent phosphor that is different from the first luminescent phosphor. The first luminescent phosphor and the second luminescent phosphor have indistinguishable excitation energy wavelengths and emission wavelengths, but distinguishable temporal decay properties. The validation device includes an exciting light source, optionally an optical filter, a first detector element and a second detector element, and a processing unit. The first detector element is configured to detect a first image of an area of the article at a first time and is further configured to output electronic signal data for the first image, and the second detector element is configured to detect a second image of substantially the same area of the article at a second time and is further configured to output electronic signal data for the second image. The processing unit collects and evaluates the output electronic signal data, and is configured to determine whether the first image and the second image exhibit expected temporal decay properties for the type of first luminescent phosphor or second luminescent phosphor that is present in the area of the first image and the second image.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Articles, methods of validating the articles, and validations systems that employ decay constant modulation are provided herein. In particular, the articles include a substrate and a security feature on the substrate, with the security feature having separate regions of a first ink composition and a second ink composition that include a first luminescent phosphor and a second luminescent phosphor, respectively. The first luminescent phosphor and the second luminescent phosphor are different from each other by exhibiting different temporal decay properties to enable an added layer of security. However, although the first luminescent phosphor of the first ink composition and the second luminescent phosphor of the second ink composition are different from each other, they have indistinguishable excitation energy wavelengths and emission wavelengths, but distinguishable temporal decay properties. By "indistinguishable" or "distinguishable," it is meant that the differences in the referenced properties either cannot or can be differentiated between the first luminescent phosphor and the second luminescent phosphor with commercially available diagnostic tools and devices. Whether temporal decay properties between the first luminescent phosphor and the second luminescent phosphor are distinguishable or not may also be impacted by a particular method of validating the article. Due to the indistinguishable excitation energy wavelengths and emission wavelengths, but distinguishable temporal decay properties, to a potential counterfeiter, the first luminescent phosphor and the second luminescent phosphor appear to be identical based upon excitation energy wavelengths and emission wavelengths, but the first luminescent phosphor and the second luminescent phosphor exhibit the different temporal decay properties, e.g. different decay rate constants (Tau), such that the first luminescent phosphor and the second luminescent phosphor 26 can still be distinguished through comparison of the temporal decay properties.

Figure 1:
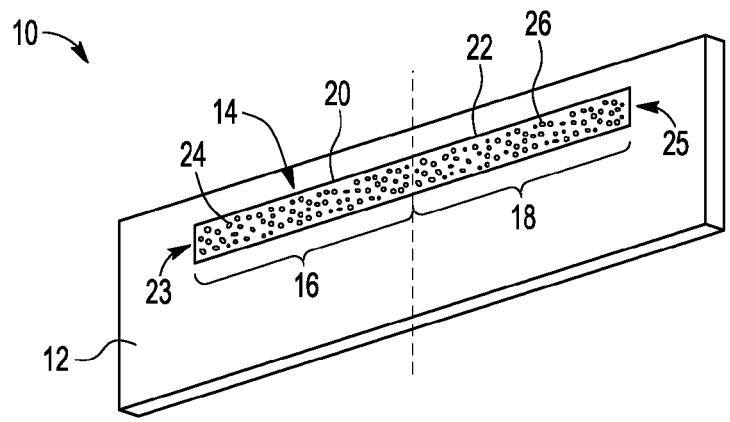
FIG. 1 is a perspective view of an exemplary embodiment of an article including a substrate and a security feature thereon.

In an embodiment and as shown in FIG. 1, an article 10 including a substrate 12 and a security feature 14 on the substrate 12 is provided. Specific types of articles that can be employed for purposes herein are not particularly limited and, in various embodiments, the substrate 12 may be rigid or flexible and may be formed from one or more layers or components. The "substrate," as referred to herein, is an object upon which the security feature 14 is formed, and it is to be appreciated that additional layers or objects may be disposed over the security feature 14 on the substrate 12 so long as the security feature 14 can be exposed to light 102 produced by an exciting light source 104 (shown in FIG. 3), and so long as emissions from the security feature 14 can be detected with a photodetector, as described in further detail below. The variety of configurations of substrate 12 are too numerous to mention, as the security features described herein may be used in conjunction with a vast array of different types of articles. Therefore, although a simple, unitary substrate 12 is illustrated in FIG. 1, it is to be understood that substrate 12 may have any of a variety of different configurations. In addition, although inanimate, solid articles are discussed herein, it is to be understood that an "article" also may include a human, an animal, a biological specimen, and virtually any other object or material onto which a security feature 14 of an embodiment may be included. As contemplated herein, the article 10 may be particularly suitable as a banknote because the security feature 14 can be validated while the article 10 is moving, such as may be the case during banknote validation in banknote processing systems. In this embodiment, the substrate 12 is paper stock that may include numerous other features, for security or otherwise, in addition to the security feature 14 that is described herein. Specific examples of other suitable articles that can include the security feature 14 include, but are not limited to, an identification card, a driver's license, a passport, identity papers, a check, a document, a paper, a stock certificate, a packaging component, a credit card, a bank card, a label, a seal, a postage stamp, a liquid, a human, an animal, and a biological sample.

Referring to FIG. 1, the security feature 14 is disposed on the substrate 12 and includes a first region 16 that has a first ink composition 20 and a second region 18 that has a second ink composition 22. "Ink compositions," as referred to herein, refer to an entire composition that is printed on the substrate, including luminescent phosphors contained therein and described in further detail below, and not just individual components of the composition that is printed on the substrate. In an embodiment, the first ink composition 20 and the second ink composition 22 are visibly indistinguishable, meaning that any visible light-reflecting pigments that are present in the first ink composition 20 and the second ink composition 22 are the same so that the first ink composition 20 and the second ink composition 22 appear to be one in the same to the human eye. In a further embodiment, the first ink composition 20 and the second ink composition 22 are chemically indistinguishable, meaning that the first ink composition 20 and the second ink composition 22 include the same chemical components, and neither the first ink composition 20 nor the second ink composition 22 include any chemical components that are not present in the other. In these embodiments, with the first ink composition 20 and the second ink composition 22 visibly and/or chemically indistinguishable, a robust barrier to identification of different ink compositions 20, 22 in the security feature 14 is provided since a person without knowledge of the security feature 14 cannot easily determine that the security feature 14 includes more than one ink composition, thereby hindering efforts to identify chemical components in the first ink composition 20 and the second ink composition 22.

In an embodiment and referring again to FIG. 1, the first region 16 of the security feature 14 includes a first pattern 23 of the first ink composition 20 and the second region 18 includes a second pattern 25 of the second ink composition 22. As referred to herein, "pattern" refers to any configuration of the respective ink composition on the substrate 12 and is not particularly limited, although intricate patterns of lines and/or dots may assist with maintaining security of the article 10. When the first ink composition 20 and the second ink composition 22 are visibly indistinguishable, the first pattern 23 and the second pattern 25 are optionally visually complementary to visually appear as a unitary pattern in the article 10, as shown by the first pattern 23 and the second pattern 25 forming a unitary bar in FIG. 1, thereby further hindering any potential efforts to identify specific regions 16, 18 in the security feature 14 that include different ink compositions 20, 22. Although not shown, it is to be appreciated that more complex complementary first patterns 23 and second patterns 25 can be provided to further hinder efforts to identify diverse regions of the first ink composition 20 and the second ink composition 22. Further, although not shown, it is to be appreciated that the security feature can include more than one region that is printed with each ink composition 20, 22, and it is also to be appreciated that more than two ink compositions can be employed in accordance with the articles, methods of validating the articles, and validation systems described herein.

Figure 2:
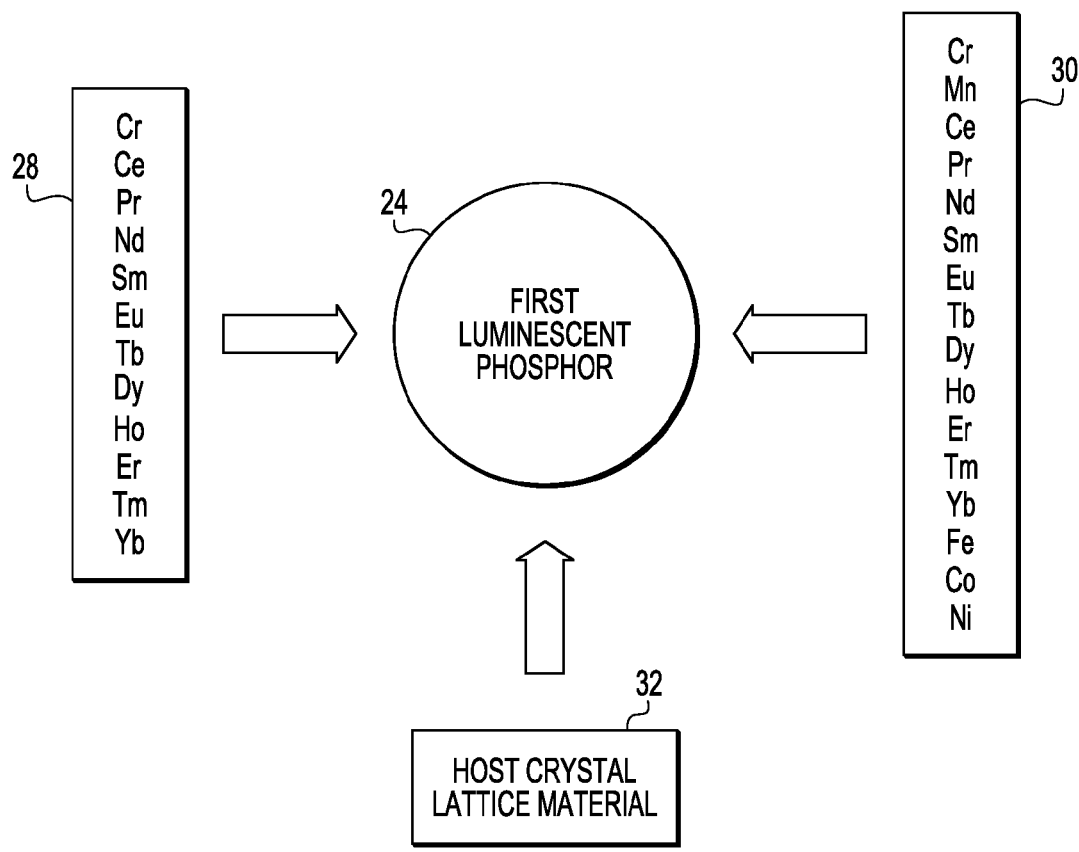
FIG. 2 depicts potential components of a luminescent phosphor in accordance with various exemplary embodiments.

The first ink composition 20 includes a first luminescent phosphor 24, and may optionally include other components that are commonly included in ink compositions such as, but not limited to, pigments, fillers, binders, and combinations thereof. A luminescent phosphor, as referred to herein, is a compound that is capable of emitting detectable quantities of radiation in the infrared, visible, and/or ultraviolet spectrums upon excitation of the luminescent phosphor by an external energy source. Referring to FIG. 2, potential components of the first luminescent phosphor 24 are illustrated. In particular, the first luminescent phosphor 24 includes an emitting ion 28, a host crystal lattice material 32, and optionally a "disturbing" ion 30. Although not shown, the first luminescent phosphor 24 also optionally includes a "sensitizing" ion (not shown). As referred to herein, a "disturbing" ion 30 is a material that modifies temporal decay properties, e.g., decay rate constant, of the first luminescent phosphor 24 as compared to temporal decay properties in the absence of the disturbing ion 30. As also referred to herein, a "sensitizing" ion is an ion that can absorb and transfer excitation energy to the emitting ion 28. Sensitizing ions are well known in the art, although sensitizing ions are not specifically discussed herein. It is to be appreciated that, for purposes herein, the first luminescent phosphor 24 may include a plurality of emitting ions 28 and/or sensitizing ions.

The first luminescent phosphor 24 produces radiation by (1) absorbing incident radiation from the emitting ion(s) 28 or by either or both of the host crystal lattice material 32 and the sensitizing ion(s), (2) energy transfer from the host crystal lattice material 32/sensitizing ion(s) to the emitting ion(s) 28, and (3) radiation of the transferred energy by the emitting ion(s) 28. In whichever manner the exciting radiation is absorbed, the emitting ion(s) 28 of the first luminescent phosphor 24 produces emitted radiation having a unique spectral signature and a measurable decay time constant (Tau).

The host crystal lattice material 32 comprises a material into which emitting ions 28 and disturbing ions 30 and optionally sensitizing ions are incorporated (e.g., substituted). As used herein, the term "substituted" means substituted at any percentage, including low, medium, and high substitution percentages. The host crystal lattice material 32 may be in the form of a crystal lattice into which different chemical constituents may substitute various positions within the crystal lattice. In various embodiments, the host crystal lattice material 32 is chosen from an oxide, a fluoride, an oxysulfide, a halide, a borate, a silicate, a gallate, a phosphate, a vanadate, an oxyhalide, an aluminate, a molybdate, a tungstate, a garnet, a niobate, and combinations thereof, although other host crystal lattice materials 32 may be used, as well. For example, but not by way of limitation, the host crystal lattice material 32 may include a yttrium (Y) aluminum garnet (YAG, or $Y_3Al_5O_{12}$), yttrium oxysulfide (YOS, or $Y_2O_2S$), a gadolinium (Gd) gallium garnet (GGG, $Gd_3Ga_5O_{12}$), or other materials.

The amount of each ion substituted into the host crystal lattice material 32 is generally described in terms of atomic percent, where the total number of ions of the host crystal lattice material 32 that may be theoretically replaced by emitting ions 28, optional sensitizing ions, and/or optional disturbing ions 30 is equal to 100%, which value does not include ions of the host crystal lattice material 32 that cannot be replaced. An ion of the host crystal lattice material 32 that allows for replacement with sensitizing, emitting and/or disturbing ions 30 may have similar size, similar loading, and similar coordination preference as the ions with which it will be replaced. As various positions within a host crystal lattice material 32 may occur, the ions on each of these positions will be accounted for 100 atomic percent.

According to various embodiments and as shown in FIG. 2, the emitting ion 28 is chosen from chromium, cerium, praseodymium, neodymium, samarium, europium, terbium, dysprosium, holmium, erbium, thulium, ytterbium, and combinations thereof. For example, one or more of the emitting ion(s) 28 may have +3 valences, in an embodiment, although one or more of the emitting ion(s) 28 may have different valences (e.g., +2 and/or +4), in other embodiments.

In various embodiments, the total concentration of emitting ion(s) 28 substituted into the host crystal lattice material 32 is sufficient to cause the first luminescent phosphor 24 to produce a detectable emission after being appropriately subjected to exciting radiation. For example, the total concentration of emitting ion(s) 28 substituted in the host crystal lattice material 32 may be in a range from about 0.095 atomic percent to about 99.995 atomic percent. However, the concentration of emitting ion(s) 28 that may be substituted while still producing the functionality of the luminescent phosphor (e.g., the functionality of producing an emission upon exposure to exciting radiation) depends on the type of ion that is being substituted. In other words, some ions may be substituted at relatively high percentages while still maintaining the functionality of the first luminescent phosphor 24, but the functionality may be defeated if other ions are substituted at the same, relatively high percentages.

The disturbing ion 30 is different from the emitting ion 28 and, when present, modifies temporal decay properties of the first luminescent phosphor 24. According to various embodiments, the disturbing ion 30 is chosen from chromium, manganese, cerium, praseodymium, neodymium, samarium, europium, terbium, dysprosium, holmium, erbium, thulium, ytterbium, iron, cobalt, nickel, and combinations thereof.

A total concentration of disturbing ion(s) 30 substituted into the host crystal lattice material 32 of the first luminescent phosphor 24 is not particularly limited. However, in an embodiment, the total concentration of disturbing ion(s) 30 may be in a range from about 0.0003 atomic percent to about 0.5 atomic percent, such as from about 0.001 to about 0.2 atomic percent or more, in various embodiments, although the disturbing ion(s) 30 may be included in lower or higher atomic percentages, as well. The concentration of disturbing ion(s) 30 substituted into the host crystal lattice material 32 may be greater than any background impurity level for the raw materials, while being at a sufficient concentration to achieve a desired decay time constant. The concentration of disturbing ion(s) 30 is directly related to the reduction in the decay time constant for the first luminescent phosphor 24. The direct relationship may be linear or non-linear, depending on the chemistry of the first luminescent phosphor 24. A benefit of adding the disturbing ion(s) 30 in lower concentrations is that the disturbing ion(s) 30 may be very difficult to detect without access to sophisticated equipment and techniques (e.g., Glow Discharge Mass Spectroscopy (GDMS)). Accordingly, the elemental composition of the first luminescent phosphor 24, according to an embodiment, may be very difficult to reverse engineer. For example, typical energy dispersive X-ray microanalysis, electron backscatter diffraction, or micro X-ray fluorescence systems may not be capable of quantifying elements having low (e.g., 1% or less) concentrations in the first luminescent phosphor 24.

After exposure to exciting radiation, the emitting ion(s) 28 within the first luminescent phosphor 24 emit photons, and the intensity of the emission over time may be observed. Upon removal of the exciting radiation, the intensity of the emission decays over time, and the rate of decay for each emitting ion 28 can be characterized as the decay time constant (Tau). For example, for a simple exponential decay in emission intensity, the decay time constant can be represented by the constant t (Tau) in the equation:

$$I(t) = I_0 e^{-t/\tau},$$ (Equation 1)

where t denotes time, I denotes the emission intensity at time t, and $I_0$ denotes the emission intensity at t=0 (e.g., t=0 may correspond to the instant when the provision of exciting radiation is discontinued). Although the emission intensity for some luminescent phosphors may decay according to the above, simple exponential formula, the emission intensity for other luminescent phosphors may be affected by multiple exponential decays (e.g., when multiple mechanisms affecting the decay are present). According to an embodiment, each emitting ion 28 possesses a first decay time constant if the emitting ion 28 were to be "undisturbed" within the first luminescent phosphor 24 (e.g., as in a normal production phosphor). The term "undisturbed," when applied to an emitting ion 28, refers to the emitting ion 28 being included in a luminescent phosphor that lacks a corresponding disturbing ion 30 that otherwise may have a significant effect on the emissions of the emitting ion 28, where a "significant effect" means an effect that is measurably greater than effects that may otherwise be produced due to rare earth impurities (e.g., impurities present in small amounts, such as a few ppm) present in the normal production phosphor. This decay time constant associated with the undisturbed emitting ion 28 is referred to herein as an "undisturbed decay time constant," which characterizes a luminescent phosphor (e.g., a normal production phosphor) that does not include any disturbing ion(s) 30 beyond the level of rare earth impurities that may be associated with the raw materials. A level of rare earth impurities in an "undisturbed" luminescent phosphor depends on the purity level of the phosphor raw materials. Although a relatively low level of impurities may produce only minor changes to emitted radiation temporal properties of the first luminescent phosphor 24, higher levels of impurities may produce more pronounced changes in the temporal properties of the first luminescent phosphor 24.

In embodiments, the first luminescent phosphor 24 has a target decay time constant and is produced to have the target decay time constant, and methods are known for producing the first luminescent phosphors 24 with target decay time constants despite the presence of a varying amount of impurity ions in different lots of phosphor raw materials. Selection of phosphor raw materials with a sufficiently high purity and a reasonable cost is a cost/performance balance that can be actively adjusted to create the first luminescent phosphor 24 with desired properties (e.g., a desired, pre-defined, target decay time constant) in an economical manner. According to an embodiment, phosphor raw materials are selected, based on them having a decay time constant that is higher than the target, disturbed decay time constant, and disturbing ions 30 are added to the phosphor raw materials in order to lower the decay time constant of the synthesized first luminescent phosphor 24 to the target, disturbed decay time constant.

As set forth above, and referring back to FIG. 1, the second ink composition 22 is present in the second region 18 of the security feature 14. The second ink composition 22 includes a second luminescent phosphor 26 that is different from the first luminescent phosphor 24, although the first luminescent phosphor 24 and the second luminescent phosphor 26 have the indistinguishable excitation energy and emission wavelengths. By providing the first luminescent phosphor 24 and the second luminescent phosphor 26 with indistinguishable excitation energy and emission wavelengths, which may exhibit relatively similar signal magnitudes per unit of printed area after the initial excitation of that excited area, measurement of excitation and emission properties of the security feature 14 by potential counterfeiters will not indicate that the security feature 14 includes diverse ink compositions 20, 22, especially when the first ink composition 20 and the second ink composition 22 themselves are visibly and/or chemically indistinguishable. Coupled with the potential to form visually complementary first patterns 23 and second patterns 25 with the first ink composition 20 and the second ink composition 22, respectively, in the security feature 14, discovery of diverse ink compositions 20, 22 in the security feature 14 is rendered even more elusive.

In an embodiment, the first luminescent phosphor 24 and the second luminescent phosphor 26 have the same chemical components and are chemically indistinguishable. In particular, in this embodiment, the second luminescent phosphor 26 includes the same emitting ion 28 and the same host crystal lattice material 32 as the first luminescent phosphor 24, thereby enabling the first luminescent phosphor 24 and the second luminescent phosphor 26 to have the indistinguishable excitation energy and emission wavelengths. Further, in an embodiment, both the first luminescent phosphor 24 and the second luminescent phosphor 26 include the disturbing ion 30, and the disturbing ion 30 is the same in the first luminescent phosphor 24 and the second luminescent phosphor 26. By providing the first luminescent phosphor 24 and the second luminescent phosphor 26 having the same chemical components, identifying the first ink composition 20 and the second ink composition 22 may be made very difficult to potential counterfeiters without access to sophisticated equipment and techniques. However, it is contemplated that in other embodiments, the first luminescent phosphor 24 and the second luminescent phosphor 26 can have different chemical components, e.g., the first luminescent phosphor 24 and the second luminescent phosphor 26 may include different emitting ions 28 and/or host crystal lattice materials while still having the indistinguishable excitation energy and emission wavelengths with the first luminescent phosphor 24.

Temporal decay properties of the first luminescent phosphor 24 and the second luminescent phosphor 26 can be rendered distinguishable even when the first luminescent phosphor 24 and the second luminescent phosphor 26 have indistinguishable excitation energy and emission wavelengths, and even when the first luminescent phosphor 24 and the second luminescent phosphor 26 have the same chemical components. In an embodiment, the first luminescent phosphor 24 and the second luminescent phosphor 26 have different amounts of the emitting ion 28, the disturbing ion 30, or both. By differing the amounts of the emitting ion 28 and/or the disturbing ion 30, temporal decay properties of the first luminescent phosphor 24 and the second luminescent phosphor 26 can be shifted enough to enable existing validation devices to distinguish between the first ink composition 20 and the second ink composition 22. In an embodiment, the first luminescent phosphor 24 and the second luminescent phosphor 26 differ only by having different amounts of the disturbing ion 30, with the first luminescent phosphor 24 and the second luminescent phosphor 26 identical in every other way. In this embodiment, decay rate constants (Tau) of the first luminescent phosphor 24 and the second luminescent phosphor 26 can be measurably shifted even when differences in amounts of the disturbing ion 30 are below detection limits in most commercially available diagnostic equipment. For example, certain disturbing ions 30 can be present in amounts of from greater than to about 1000 ppm, such as from about 50 to about 800 ppm, to effectuate a distinguishable decay rate constant in a luminescent phosphor, and the amount of disturbing ions 30 can be varied by at least 50, such as from about 50 to about 200 ppm, to enable the decay rate constants of the first luminescent phosphor 24 and the second luminescent phosphor 26 to be distinguishable. Alternatively, when the first luminescent phosphor 24 and the second luminescent phosphor 26 include different amounts of the disturbing ion 30 with each of the amounts being above detection limits in most commercially available diagnostic equipment, such as energy dispersive X-ray spectroscopy equipment, the differences in the amounts can be sufficiently small that the diagnostic equipment does not register a difference in the amounts, all while still measurably distinguishing the decay rate constants of the first luminescent phosphor 24 and the second luminescent phosphor 26. For example, decay rate constants between the first luminescent phosphor 24 and the second luminescent phosphor 26 can be shifted to be distinguishable using existing validation devices by varying an amount of the disturbing ion 30 between the first luminescent phosphor 24 and the second luminescent phosphor 26 by at least 50 ppm, such as from about 50 to about 200 ppm. However, it is to be appreciated that specific differences between the amount of the disturbing ion 30 in the first luminescent phosphor 24 and the second luminescent phosphor 26 are generally determined on a case by case basis because host lattice material may affect the decay rate constants. The amount of difference in decay rate constants that can be accurately detected may be influenced based on an amount of ink printing, an amount of averaging that can be performed by comparing images from multiple different locations in the security feature 14, and the differences in the decay rate constants such that statistical analysis indicates that the decay rate constants are different to an appropriate number of standard deviations based on the particular measurement technique.

In one specific example of a security feature 14 having the first region 16 including the first ink composition 20 and the second region 18 including the second ink composition 22, the first luminescent phosphor 24 and the second luminescent phosphor 26 emit at wavelengths that are lower than 1100 nm, which is the detection limit for silicon detectors and which makes identification of the components in the luminescent phosphors 24, 26 difficult. For example, in this embodiment, ytterbium is the emitting ion 28 for both the first luminescent phosphor 24 and the second luminescent phosphor 26. Ytterbium can exhibit decay lifetimes in the 0.1 to 1.3 millisecond range depending on ytterbium concentration as well as the host lattice material. Examples of suitable host crystal lattice materials 32 in this embodiment include various garnets such as yttrium aluminum garnet (YAG), yttrium gallium garnet (YGG) and gadolinium gallium garnet (GGG). Alternative materials are borates, phosphates, niobates, fluorides and oxysulfides. Optionally, a sensitizing ion such as chromium is doped or substituted into the host crystal lattice material 32, which acts as the primary absorber when present and transfers the energy non-radiatively to the ytterbium ion. Neodymium can also act as a sensitizing ion or an additional energy transfer agent. In any case, for this example, ytterbium is the final emitter and no disturbing ions 30 are present. By ranging the ytterbium concentration from 5% to 15% in Nd:Yb:YAG between the first luminescent phosphor 24 and the second luminescent phosphor 26, a decay lifetime can change from 0.87 milliseconds to 0.58 milliseconds, which is a significant enough difference to enable the first luminescent phosphor 24 and the second luminescent phosphor 26 to be distinguished based upon the temporal decay properties thereof.

Figure 3:
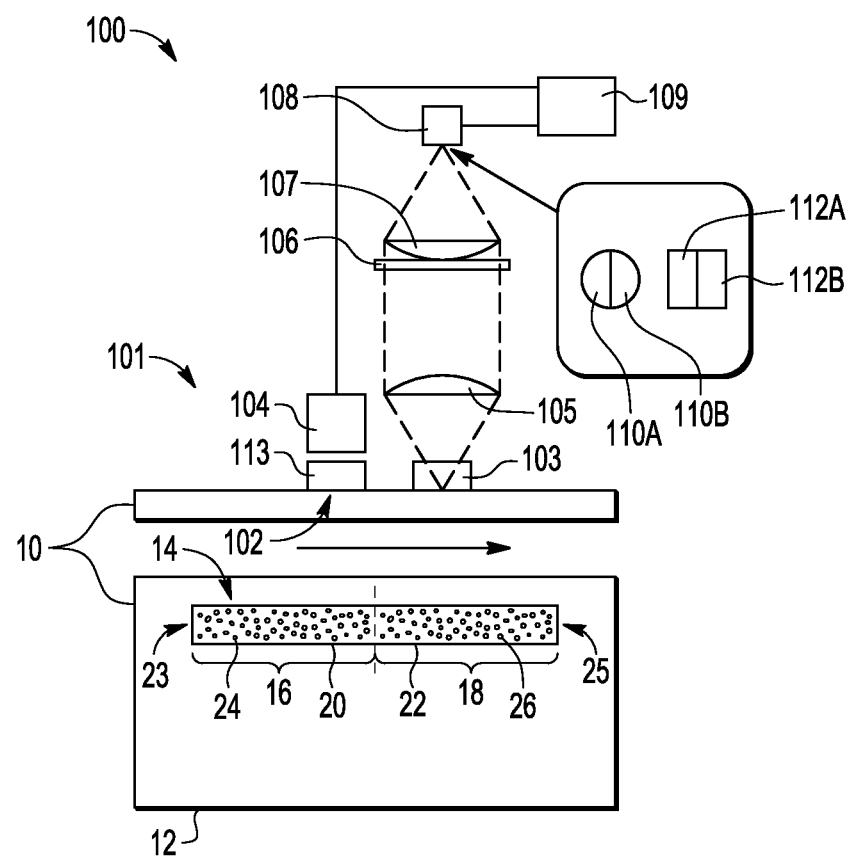
FIG. 3 is a schematic view of a validation system including an article and a validation device in accordance with an exemplary embodiment.

An exemplary validation system 100 and method of validating an article 10 will now be described with reference to FIG. 3. The exemplary validation system 100 includes a validation device 101 that is configured to validate the article 10. The validation device 101 includes the exciting light source 104, optionally an optical filter 106, at least one photodetector 108, and a processing unit 109. The exciting light source 104 produces light 102 that has sufficient intensity to excite the first luminescent phosphor 24 and the second luminescent phosphor 26, and the exciting light source 104 produces light 102 through which the article 10 can be passed. One exemplary type of photodetector that is suitable for use with the present technology is a bi-cell photodetector 108, as illustrated in FIG. 3, which includes a first detector element 110A, 112A and a second detector element 110B, 112B. In an embodiment, the bi-cell photodetector 108 houses the first detector element 110A, 112A adjacent to the second detector element 110B, 112B. The first detector element 110A, 112A and the second detector element 110B, 112B comprise the same material, such as silicon or InGaAs. As illustrated in FIG. 3, the bi-cell photodetector 108 can be circular, having a first detector element 110A and a second detector element 110B, or can be rectangular or square, having the first detector element 112A and the second detector element 112B. The first detector element 110A, 112A and the second detector element 110B, 112B are assembled to form a split or separation line, as shown by first detector element 110A and second detector element 110B, and first detector element 112A and second detector element 112B. One example of a commercially available bi-cell photodetector 108 is detector model SD113-24-21-021, which is manufactured by Advanced Photonix of Ann Arbor, Mich.

To validate the article 10 using the validating device of FIG. 3, the article 10 is exposed to the light 102 that is produced by the exciting light source 104. For example, using the validating device of FIG. 3, the light 102 is provided by the exciting light source 104 and is focused through an exciting light source window 113. The article 10 is moved under the exciting light source window 113, at uniform velocity that enables sequential validation of a plurality of articles, to expose the article 10 to the light 102.

The first detector element 110A, 112A is configured to detect a first image of an area of the article 10 including at least a portion of the first region 16 or at least a portion of the second region 18 at a first time, and the second detector element 110B, 112B is configured to detect a second image of substantially the same area of the article 10 at a second time. By "substantially the same area", it is meant that the area in the second image may be identical to the area in the first image, but if it is not identical, then the area in the second image does not materially impact the comparison between the first image and the second image as compared to circumstances where the first image and the second image are taken of identical areas. The first image and the second image are taken to include at least a portion of either the first pattern 23 in the first region 16 or the second pattern 25 in the second region 18. Using the validation device 101 of FIG. 3, the article 10 is moved at a uniform velocity, e.g. via rollers or belts (not shown), under a detection window 103 that is spaced from the exciting light source 104 and the light 102 produced by the exciting light source 104 to facilitate detection of the first image and the second image. When using a bi-cell photodetector 108 of FIG. 3, optical radiation from the first luminescent phosphor 24 or the second luminescent phosphor 26, depending upon the particular area of the article 10 in the first image and second image, is roughly collimated by a lens 105 and optionally passed by the optical filter 106 to filter a pre-selected emission wavelength of the first luminescent phosphor 24 or the second luminescent phosphor 26. The pre-selected emission wavelength is then focused by lens 107 onto the bi-cell photodetector 108. The first image of the area and the second image of the area are detected at different times due to spacing between the first detector element 110A, 112A and second detector element 110B, 112B. Due to the fixed velocity of the article 10, there is a fixed amount of time that passes between when the first image is detected when the second image is detected. As a result, the emission wavelength from the emitting ion 28 in the first luminescent phosphor 24 or second luminescent phosphor 26 will predictably decay due to its temporal decay properties.

Although not shown in the validation device 101 of FIG. 3, it is possible to measure the temporal decay properties statically with an alternative sensor (not shown). To measure the temporal decay properties with the alternative sensor, although not shown, at least a portion of a first region containing the first luminescent phosphor 24 or at least the portion of a second region containing the second luminescent phosphor 26 is exposed to light that is produced by an appropriate exciting light source (not shown), and the additional sensor measures the emission from the first region or second region as a function of time after exposure to the light is ceased by turning off the exciting light source. The luminescent phosphor present in the first region or second region will decay in accordance with its decay time constant (Tau) that is a property of the first luminescent phosphor 24 or the second luminescent phosphor 26. The value of Tau is then known for the area being interrogated. The additional sensor can then be placed adjacent to the other of the first region or the second region, where the other ink composition is used. The same measurement of the other of the first region or the second region can be made and a second value of Tau is derived in accordance with Equation (1) as set forth above. However, using the alternative sensor and with the substrate being static, the exciting light source is turned on to excite the appropriate luminescent phosphor 24, 26, and then turned off to observe the value of Tau. The value of Tau is derived in accordance with Equation (1) where t is time, $I_0$ is the time at which the light source is turned off and also corresponds to the maximum value of the signal, and I(t) is the observed values of the signal as a function of time. Several methods can be used to derive a good fit for the value Tau. The values can then be compared to discern if the differences are as expected.

In accordance with an exemplary method, at least one first image and second image is detected for the area including the first region 16 with the first ink composition 20, and at least one first image and second image is detected for the area that includes the second region 18 with the second ink composition 22. By detecting the first image and the second image for each distinct area that includes the respective first region 16 or the second region 18, the exemplary method enables comparison of expected temporal decay properties versus actual temporal decay properties in combination with knowledge of which ink compositions should be present in the areas of the first image and second image, and validation of the article 10 can be conducted based upon the distinct temporal decay properties that are expected in the diverse areas of which the first image and the second image are detected.

In accordance with an exemplary method, detecting the first image of the area includes detecting a plurality of first images of the first pattern 23 and the second pattern 25 with the at least one photodetector 108, and detecting the second image includes detecting a plurality of second images of substantially the same area of the first image with the at least one photodetector 108. By detecting the plurality of first images of the first pattern 23 and the second pattern 25, and by detecting the second images of substantially the same areas, variations between decay rate constants of the first luminescent phosphor 24 and second luminescent phosphor 26 can be statistically identified.

In accordance with an exemplary method, electronic signal data for the first and second images are outputted from the at least one photodetector 108. In an embodiment, output electronic signal ratios can be determined that relate to the decay characteristics (e.g., the decay rate constants) of the first luminescent phosphor 24 and the second luminescent phosphor 26. In an embodiment, the processing unit 109 collects and evaluates the output electronic signal data from the first and second detector elements 110A and 110B or 112A and 112B at pre-determined intervals relating to pre-selected distances from the light 102 produced by the exciting light source 104 on the value document, and determines pass or failure data for the article 10 based upon expected temporal decay properties for the type of first luminescent phosphor 24 or second luminescent phosphor 26 that is present in the area of the first image and the second image. The processing unit 109 may then output the pass or failure data to indicate to an operator whether the article 10 is authentic. One way in which the processing unit 109 can determine pass or failure data for the article 10 is to compare measured the output electronic signal ratio to stored data corresponding to known first luminescent phosphor 24 and the second luminescent phosphor 26 and/or known first ink compositions 20 and second ink compositions 22. The processing unit 109 can also average the measured output electronic signal ratio from the plurality of first images and the plurality of second images, as described above, to increase the accuracy of the measurement of the validation system 100.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An article comprising:
   a substrate; and
   a security feature on the substrate, wherein the security feature includes:
      a first region having a first ink composition comprising a first luminescent phosphor; and
      a second region having a second ink composition and comprising a second luminescent phosphor different from the first luminescent phosphor;
      wherein the first luminescent phosphor and the second luminescent phosphor have indistinguishable excitation energy wavelengths, indistinguishable emission wavelengths, and distinguishable temporal decay properties.

2. The article of claim 1, wherein the first luminescent phosphor comprises an emitting ion and a host crystal lattice material, and wherein the second luminescent phosphor comprises the same emitting ion and the same host crystal lattice material as the first luminescent phosphor.

3. The article of claim 2, wherein the emitting ion is chosen from chromium, cerium, praseodymium, neodymium, samarium, europium, terbium, dysprosium, holmium, erbium, thulium, ytterbium, and combinations thereof.

4. The article of claim 2, wherein the host crystal lattice material is chosen from an oxide, a fluoride, an oxysulfide, a halide, a borate, a silicate, a gallate, a phosphate, a vanadate, an oxyhalide, an aluminate, a molybdate, a tungstate, a garnet, a niobate, and combinations thereof.

5. The article of claim 2, wherein the first luminescent phosphor and the second luminescent phosphor have the same chemical components and are chemically indistinguishable.

6. The article of claim 5, wherein the first luminescent phosphor and the second luminescent phosphor further include a disturbing ion different from the emitting ion and that modifies the temporal decay properties of the first ink composition and the second ink composition, and wherein the disturbing ion is the same in the first luminescent phosphor and the second luminescent phosphor.

7. The article of claim 6, wherein the disturbing ion is chosen from chromium, manganese, cerium, praseodymium, neodymium, samarium, europium, terbium, dysprosium, holmium, erbium, thulium, ytterbium, iron, cobalt, nickel, and combinations thereof.

8. The article of claim 6, wherein the first luminescent phosphor and the second luminescent phosphor have different amounts of the emitting ion, the disturbing ion, or both.

9. The article of claim 8, wherein the first luminescent phosphor and the second luminescent phosphor differ only by having the different amounts of the disturbing ion.

10. The article of claim 1, wherein the first ink composition and the second ink composition are visibly indistinguishable.

11. The article of claim 1, wherein the first region comprises a first pattern of the first ink composition and the second region comprises a second pattern of the second ink composition.

12. The article of claim 11, wherein the first pattern and the second pattern are visually complementary and visually appear as a unitary pattern in the article.

13. The article of claim 1, further defined as a banknote.

14. A method of validating an article, said method comprising:
   providing the article comprising a substrate having a security feature thereon, with the security feature having a first region including a first ink composition comprising a first luminescent phosphor and a second region including a second ink composition comprising a second luminescent phosphor, wherein the first luminescent phosphor and the second luminescent phosphor have indistinguishable excitation energy wavelengths, indistinguishable emission wavelengths, and distinguishable temporal decay properties;
   exposing the article to light produced by an exciting light source that produces the light having sufficient intensity to excite the first luminescent phosphor and the second luminescent phosphor;
   detecting a first image of an area of the article including at least a portion of the first region or at least a portion of the second region at a first time;
   detecting a second image of substantially the same area of the article at a second time;
   determining pass or failure data for the article based upon expected temporal decay properties for the type of first luminescent phosphor or second luminescent phosphor present in the area of the first image and the second image, wherein at least one first image and second image is detected for the area including the first region and wherein at least one first image and second image is detected for the area including the second region.

15. The method of claim 14, wherein exposing the article to the light comprises moving the article at a uniform velocity through the light.

16. The method of claim 15, wherein detecting the first image and detecting the second image comprise moving the article under a detection window spaced from the exciting light source, and wherein the first image and the second image are detected through the detection window.

17. The method of claim 16, further comprising filtering a pre-selected emission wavelength from the first luminescent phosphor and the second luminescent phosphor with an optical filter.

18. The method of claim 14, wherein the first region comprises a first pattern of the first ink composition and the second region comprises a second pattern of the second ink composition, and wherein detecting the first image comprises detecting a plurality of first images of at least a portion of the first pattern and at least a portion of the second pattern and detecting the second image comprises detecting a plurality of second images of at least a portion of the first pattern and at least a portion of the second pattern.

19. The method of claim 14, wherein the at least one photodetector comprises a bi-cell photodetector that houses both a first detector element and a second detector element, and wherein the first image is detected with the first detector element and the second image is detected with the second detector element.

20. A validation system comprising a validation device configured to validate an article comprising a substrate and a security feature on the substrate, wherein the security feature includes a first region having a first ink composition comprising a first luminescent phosphor and a second region having a second ink composition and comprising a second luminescent phosphor different from the first luminescent phosphor, wherein the first luminescent phosphor and the second luminescent phosphor have indistinguishable excitation energy wavelengths, indistinguishable emission wavelengths, and distinguishable temporal decay properties, the validation device comprising:
  an exciting light source;
  optionally an optical filter;
  a first detector element and a second detector element, wherein the first detector element is configured to detect a first image of an area of the article at a first time and is further configured to output electronic signal data for the first image, and the second detector element is configured to detect a second image of substantially the same area of the article at a second time and is further configured to output electronic signal data for the second image; and
  a processing unit that collects and evaluates the output electronic signal data, wherein the processing unit is configured to determine whether the first image and the second image exhibit expected temporal decay properties for the type of first luminescent phosphor or second luminescent phosphor present in the area of the first image and the second image.

* * * * *